(12) United States Patent
Bargoti et al.

(10) Patent No.: US 8,433,877 B2
(45) Date of Patent: Apr. 30, 2013

(54) STORAGE SCALABILITY MANAGEMENT (75) Inventors: Ajay K. Bargoti, Karnataka (IN);
Rishika Kedia, Karnataka (IN);
Anbazhagan Mani, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/910,300

(22) Filed: Oct. 22, 2010

(65) Prior Publication Data
US 2012/0102290 A1    Apr. 26, 2012

(51) Int. Cl.
*G06F 12/00*    (2006.01)
(52) U.S. Cl.
USPC ..... 711/170; 711/114; 711/112; 711/E12.084
(58) Field of Classification Search ................ None
See application file for complete search history.

(56) References Cited

U.S. PATENT DOCUMENTS
2008/0148270 A1    6/2008    Gopisetty et al.

OTHER PUBLICATIONS
U.S. Appl. No. 12/910,584, filed Oct. 22, 2010, Bargoti et al.

*Primary Examiner* — Charles Rones
*Assistant Examiner* — Arvind Talukdar
(74) *Attorney, Agent, or Firm* — Yee & Associates, P.C.; Tom Tyson (57) ABSTRACT

Storage scalability management is provided by adding storage in a data processing environment. A new storage subsystem is added automatically to an available storage provider only if doing so will not reduce the performance of the storage provider to an unacceptable level. If no such storage provider is available, a new storage provider is added automatically. The new storage provider is added automatically to the server and operating system that is best able to handle the additional work. Thus, a new storage subsystem is added automatically in a data processing environment in a manner that provides for system scalability while minimizing any adverse impact on system performance.

15 Claims, 4 Drawing Sheets

STORAGE SCALABILITY MANAGEMENT

BACKGROUND

1. Field

The disclosure relates generally to data processing systems, such as computer systems and networks, and more specifically to management of storage devices, including managing the addition of storage devices to the system.

2. Description of the Related Art

A computer system includes various components. The various components of the computer system perform various different functions. For example, a computer system may be a computer network. Components of the computer network may include, for example, processors, storage devices, and other components. The components of the computer system communicate with each other via the computer network.

Effective operation of a computer system, such as a computer network, requires effective management of the various system components. For example, effective operation of a computer network requires effective management of network storage devices. Effective management of network storage devices includes effectively controlling the addition and removal of storage devices from the network.

Storage Management Initiative—Specification (SMI-S) is a storage standard developed and maintained by the Storage Network Industry Association (SNIA). The main objective of SMI-S is to enable broad interoperability among heterogeneous storage vendor systems. SMI-S defines management profiles for storage systems. A profile describes the behavioral aspects of an autonomous, self-contained management domain. SMI-S includes profiles for arrays, switches, storage virtualizer, volume management, and many other domains.

An SMI-S storage provider is a software component that is used so that independent management software can manage a storage device using a standard interface. For example, the standard interface may be based on the Common Information Model (CIM) protocol. The Common Information Model is an open standard that defines how managed elements in an information technology environment are represented as a common set of objects and relationships between them. This is intended to allow consistent management of these managed elements, independent of their manufacturer or provider.

In general, storage providers must be installed and configured before independent management software can manage certain storage devices. The storage provider can be installed on the same system that the management software is running on or on a remote system. In some solutions the management software is used in an embedded fashion to manage storage devices. Some systems have a dedicated management server. In such systems all of the management components, including the management software and the storage provider, run on the dedicated management server. An example of such a system is the IBM Smart Analytic Systems by International Business Machines Corporation. Management software in this system is known as the IBM Systems Director.

SUMMARY

According to one illustrative embodiment, a method of adding storage in a data processing environment is implemented in a processor unit. The processor unit obtains a number of metrics for each of a number of storage providers. The number of storage providers provide access to a number of storage subsystems by the data processing environment. The number of metrics provide an indication of performance of each of the number of storage providers. The processor unit determines whether the number of metrics for a selected one of the number of storage providers are within a number of threshold values. This determination indicates whether the performance of the selected one of the number of storage providers indicates that an additional storage subsystem may be added to the selected one of the number of storage providers. Therefore, responsive to a determination that the metrics for the selected one of the number of storage providers are within the number of threshold values, a storage subsystem is added to the selected one of the number of storage providers. The processor unit also determines whether the number of metrics for none of the number of storage providers are within the number of threshold values. This determination indicates whether the performance of the storage providers currently available to the data processing environment indicates that an additional storage subsystem should not be added to any of the currently available storage providers. Therefore, responsive to a determination that the number of metrics for none of the number of storage providers are within the number of threshold values, a new storage provider is added to the data processing environment and then a storage subsystem is added to the new storage provider.

According to another illustrative embodiment, an apparatus comprises a storage performance manager, a storage scalability configuration manager, a storage install manager, and a storage scalability manager. The storage performance manager is configured to provide a number of metrics for each of a number of storage providers in a data processing environment. The number of storage providers provide access to a number of storage subsystems by the data processing environment. The number of metrics provide an indication of performance of each of the number of storage providers. The storage scalability configuration manager is configured to add a storage subsystem to a storage provider. The storage install manager is configured to install and configure a new storage provider in the data processing environment. The storage scalability manager is configured to determine whether the number of metrics for a selected one of the number of storage providers are within a number of threshold values. This determination indicates whether the performance of the selected one of the number of storage providers indicates that an additional storage subsystem may be added to the selected one of the number of storage providers. Therefore, responsive to a determination that the metrics for the selected one of the number of storage providers are within the number of threshold values, the storage scalability manager invokes the storage scalability configuration manager to add a storage subsystem to the selected one of the number of storage providers. The storage scalability manager also is configured to determine whether the number of metrics for none of the number of storage providers are within the number of threshold values. This determination indicates whether the performance of the storage providers currently available to the data processing environment indicates that an additional storage subsystem should not be added to any of the currently available storage providers. Therefore, responsive to a determination that the number of metrics for none of the number of storage providers are within the number of threshold values, the storage scalability manager invokes the storage install manager to add a new storage provider to the data processing environment and then invokes the storage scalability configuration manager to add a storage subsystem to the new storage provider.

According to another illustrative embodiment, a computer program product for adding storage in a data processing environment comprises a computer readable storage medium with program instructions stored thereon. First program instructions are to obtain a number of metrics for each of a number of storage providers. The number of storage providers provide access to a number of storage subsystems by a data processing environment. The number of metrics provide an indication of performance of each of the number of storage providers. Second program instructions are to determine whether the number of metrics for a selected one of the number of storage providers are within a number of threshold values. This determination indicates whether the performance of the selected one of the number of storage providers indicates that an additional storage subsystem may be added to the selected one of the number of storage providers. Third program instructions are to add a storage subsystem to the selected one of the number of storage providers responsive to a determination that the metrics for the selected one of the number of storage providers are within the number of threshold values. Forth program instructions are to determine whether the number of metrics for none of the number of storage providers are within the number of threshold values. This determination indicates whether the performance of the storage providers currently available to the data processing environment indicates that an additional storage subsystem should not be added to any of the currently available storage providers. Fifth program instructions are to add a new storage provider to the data processing environment and to add the storage subsystem to the new storage provider responsive to a determination that the number of metrics for none of the number of storage providers are within the number of threshold values. The first, second, third, forth, and fifth program instructions are stored on the computer readable storage medium.

Further objects, features, and advantages will be apparent from the following detailed description and accompanying drawings.

DETAILED DESCRIPTION

The different illustrative embodiments recognize and take into account a number of different considerations. For example, the different illustrative embodiments recognize and take into account that storage providers are limited by either the volume of data that they can manage or the number of storage subsystem that they can manage. These limitations are due to limitations in the memory available for the storage provider, limitations in the processors available for the storage provider, and the number of concurrent threads that the storage provider must service.

An example of degrading performance from a single storage provider is shown in Table 1. As shown in Table 1, as the storage subsystems and data volumes managed by a storage provider increase, the response time of the storage provider to a service request can increase significantly.

TABLE 1

| Storage Configuration | Response Time (Storage Provider) |
| --- | --- |
| Query Volume property (20 volumes, 1 storage subsystems) | 2 minutes |
| Query Volume property (100 volumes, 5 storage subsystems) | 6 minutes |
| Query Volume property (200 volumes, 10 storage subsystems) | 12 minutes |
| Query Volume property (500 volumes, 15 storage subsystems) | 22 minutes |

The different illustrative embodiments recognize and take into account that it is possible to size system storage requirements and configure the storage provider accordingly. However, it is desirable that data processing system capacity need not remain static, but be allowed to grow in size to satisfy new demands on the system. Growing data processing system capacity may require adding new storage subsystems as the system grows. In this case, due to the scalability limitations of the storage provider, storage provider response time may increase significantly as new storage subsystems are added and the volume of data managed increases. In some cases, storage provider response time may increase to such an extent that it may not be possible to perform basic storage operations like 'query volume' and 'collect inventory' in any reasonable amount of time. The inability to perform storage operations in a reasonable time poses a serious limitation to overall system manageability.

The different illustrative embodiments recognize and take into account that a know method for handling storage scalability includes installing a storage provider on a remote node. The storage provider then is added to the system manager. Storage subsystems then are connected to the storage provider. However, this solution presents multiple issues that need to be handled for the solution to work effectively. The system administrator first needs to determine manually which server on the network has the available disk space, processor requirements, and memory requirements to host the storage provider. Once the appropriate server is identified, the storage provider needs to be installed and configured on that server. The storage subsystems then need to be added to the storage provider. This manual method for adding a storage provider to a system is time-consuming and not-optimal.

Therefore, the different illustrative embodiments recognize and take into account that there is a need for efficient handling of storage subsystems in a data processing environment by the system manager. Specifically, the different illustrative embodiments recognize and take into account that there is a need to manage effectively the addition of storage subsystems to a system by the system manager.

In accordance with an illustrative embodiment, the system manager of a data processing system includes components adapted to monitor the performance of a storage provider at runtime. Based on the monitored performance metrics of the storage provider, the system manager automatically deploys and configures additional storage providers. The additional storage providers may be located at remote servers. The additional storage providers are deployed automatically based on a 'best-fit' algorithm.

Figure 1:
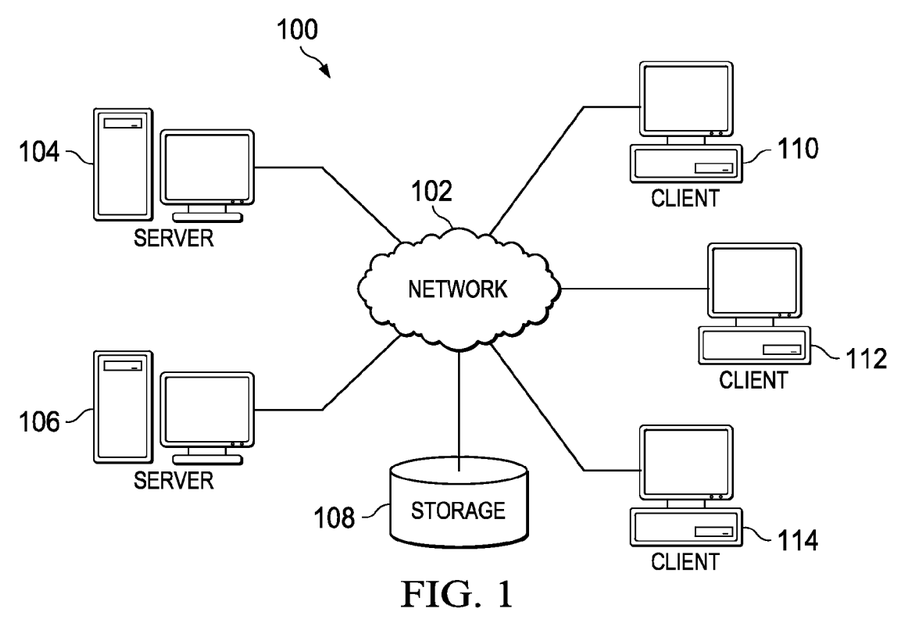
FIG. 1 is a diagram of a data processing environment in which illustrative embodiments may be implemented.

With reference now to the figures, and in particular with reference to FIG. 1, a diagram of a data processing environment is provided in which illustrative embodiments may be implemented. It should be appreciated that FIG. 1 is provided as an illustration of only one possible implementation and is not intended to imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102. Network 102 is the medium used to provide communication links between various devices and computers connected together within network data processing system 100. Network 102 may include connections, such as wire connections, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 may be the Internet. In this case, network 102 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
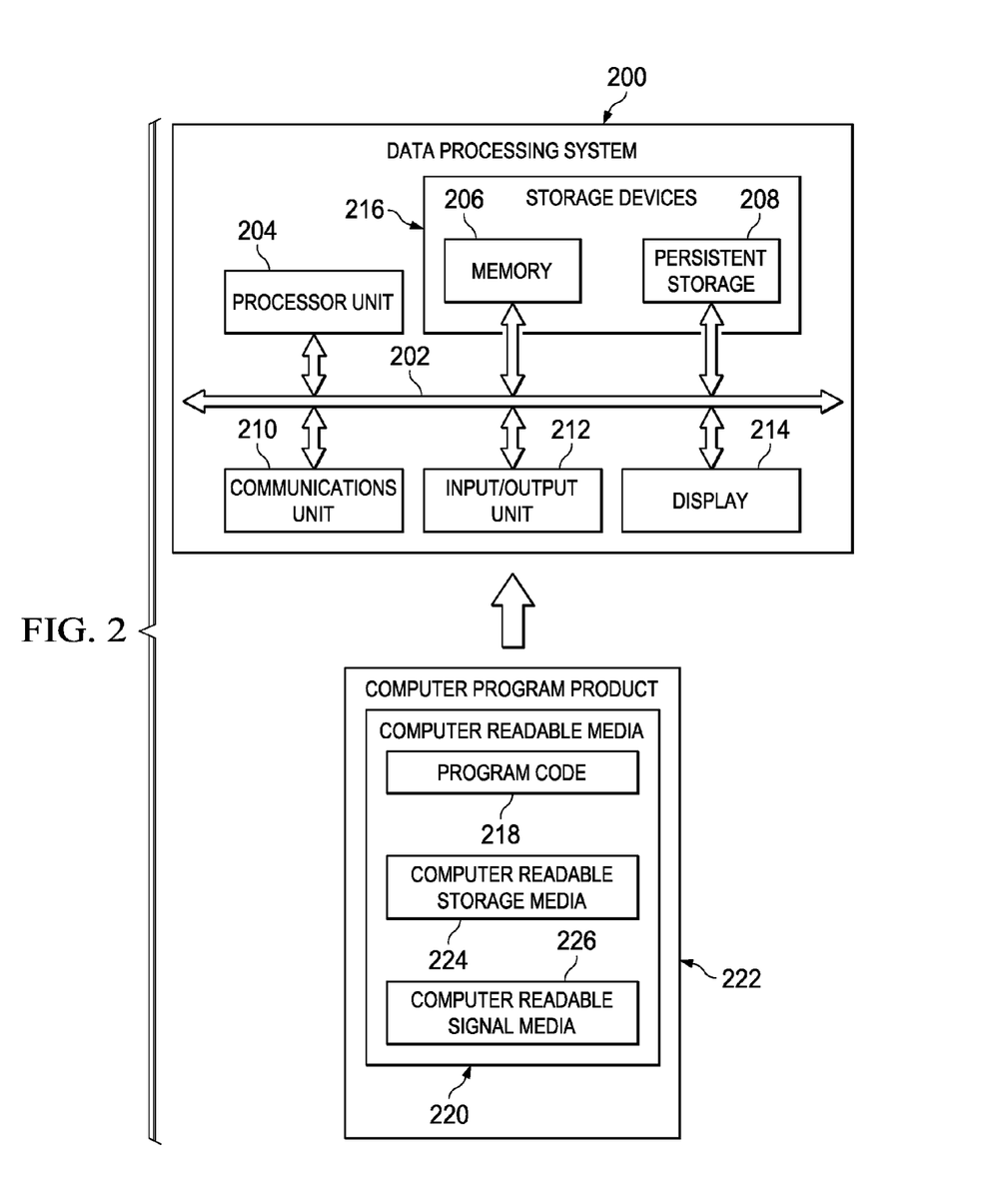
FIG. 2 is a block diagram of a data processing system depicted in accordance with an illustrative embodiment.

Turning now to FIG. 2, an illustration of a data processing system is depicted in accordance with an illustrative embodiment. In this example, data processing system 200 is one example of a possible implementation of server computers 104 and 106 or client computers 110, 112, and 114 in FIG. 1. In this illustrative example, data processing system 200 includes communications fabric 202. Communications fabric 202 provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may include a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system including multiple processors of the same type.

Memory 206 and persistent storage 208 are examples of storage devices 216. A storage device is any piece of hardware that is capable of storing information, such as, for example, without limitation, data, program code in functional form, and/or other suitable information, either on a temporary basis and/or on a permanent basis. Memory 206, in these examples, may be, for example, a random access memory or any other suitable volatile or non-volatile storage device. Persistent storage 208 may take various forms, depending on the particular implementation.

Persistent storage 208 may include one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links. In this example, communications unit 210 may provide communications via network 102 in FIG. 1.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in storage devices 216, which are in communication with processor unit 204 through communications fabric 202. In these illustrative examples, instructions are stored in a functional form on persistent storage 208. These instructions may be loaded into memory 206 and run by processor unit 204. The processes of the different embodiments may be performed by processor unit 204 using computer implemented program instructions, which may be located in a memory, such as memory 206.

These instructions are referred to as program code, computer usable program code, or computer readable program code that may be read and run by a processor in processor unit 204. Program code in the different embodiments may be embodied on different physical or computer readable storage media, such as memory 206 or persistent storage 208.

Program code 218 may be located in a functional form on computer readable media 220. Computer readable media 220 may be selectively removable and program code 218 may be loaded onto or transferred to data processing system 200 from computer readable media 220 and run by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer of program code 218 onto a storage device, such as a hard drive, that is part of persistent storage 208. Computer readable storage media 224 also may take the form of persistent storage, such as a hard drive, a thumb drive, or a flash memory, that is connected to data processing system 200. In some instances, computer readable storage media 224 may not be removable from data processing system 200. Computer readable storage media 224 specifically excludes mere propagating signals.

Alternatively, program code 218 may be transferred to data processing system 200 using computer readable signal media 226. Computer readable signal media 226 may be a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network from another device or data processing system through computer readable signal media 226 to persistent storage 208 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. Different advantageous embodiments may be implemented in a data processing system including components in addition to or in place of those illustrated for data processing system 200. Other components shown in FIG. 2 may be varied from the illustrative examples shown. Different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 may be any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, communications unit 210 may include one or more devices used to transmit and receive data, such as a modem or a network adapter. Further, a memory may be, for example, memory 206, or a cache such as found in an interface and memory controller hub that may be present in communications fabric 202.

Figure 3:
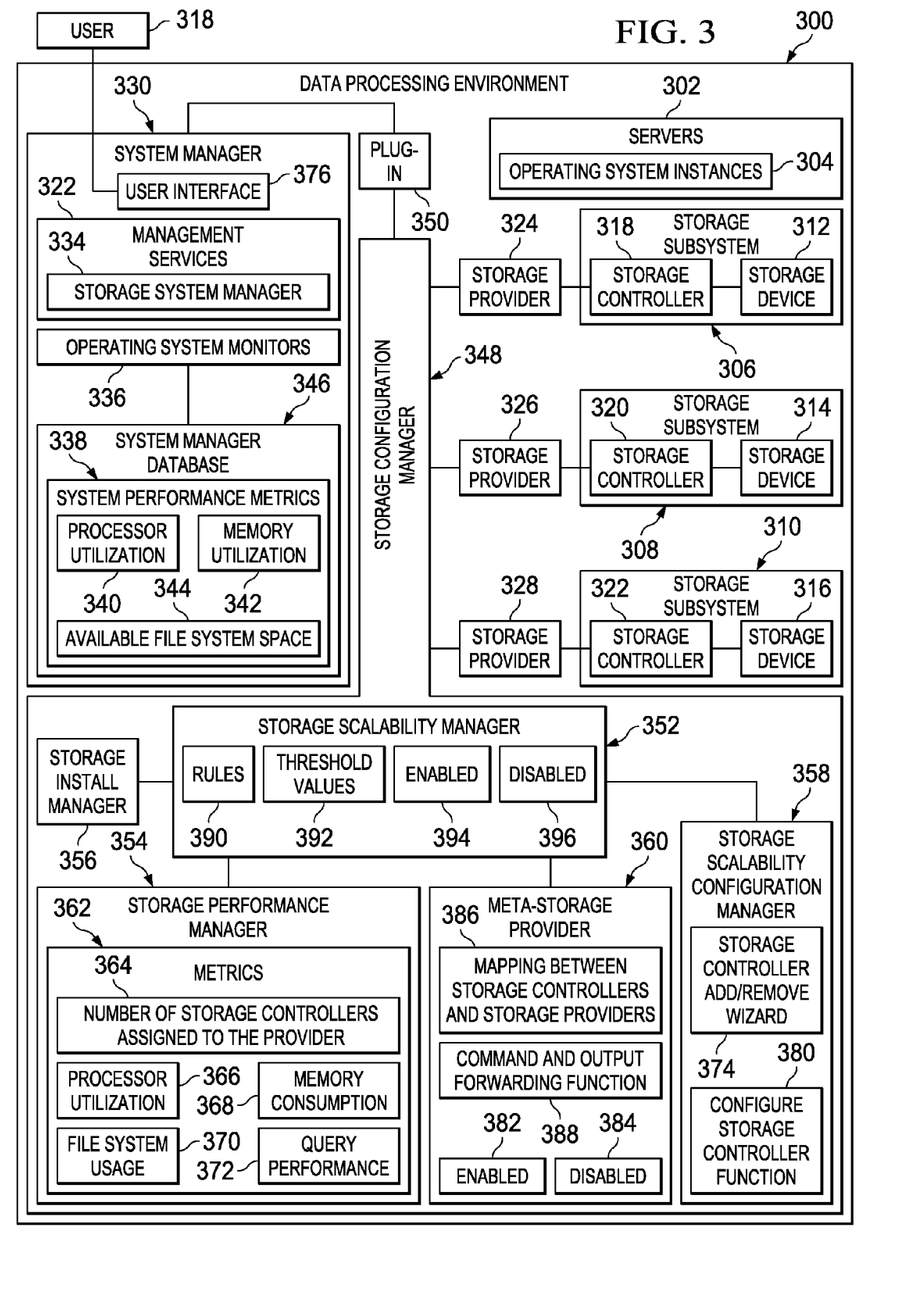
FIG. 3 is a functional block diagram of a system for providing storage scalability management in accordance with an illustrative embodiment.

A data processing environment in which storage scalability management in accordance with an illustrative embodiment may be implemented is depicted in FIG. 3. In this example, data processing environment 300 may include any data processing system or device or a network of data processing systems and devices. For example, data processing environment 300 may be an example of one implementation of network data processing system 100 in FIG. 1 or of any other network data processing system.

Data processing environment 300 may include number of servers 302. Servers 302 are implemented as data processing systems. In this example, data processing system 200 in FIG. 2 is an example of one implementation of a data processing system that may be used to implement number of servers 302. Number of servers 302 may be connected in a network to form data processing environment 300.

Operating system instances 304 are run on servers 302. One or more operating system instances 304 may be running on each one of servers 302 at any given time.

Data processing environment 300 may include a number of storage subsystems 306, 308, and 310. Three storage subsystems 306, 308, and 310 are shown for example in FIG. 3. However, data processing environment 300 in accordance with an illustrative embodiment may include more or fewer storage subsystems.

Each storage subsystem 306, 308, and 310 includes at least one storage device 312, 314, and 316 and at least one storage controller 318, 320, and 322. Storage controller 318, 320, and 322 is a hardware device, or a hardware device operating in combination with software or firmware, that provides an interface to a respective storage device 312, 314, and 316. Each storage controller 318, 320, and 322 may provide the interface for more than one storage device 312, 314, or 316.

Storage providers 324, 326, and 328 provide access to storage subsystems 306, 308, and 310 by data processing environment 300. For example, storage providers 324, 326, and 328 may provide access to data stored in storage subsystems 306, 308, and 310 by applications running in data processing environment 300. Each storage provider 324, 326, and 328 may manage one or more storage subsystems 306, 308, and 310. Each storage provider 324, 326, and 328 is a software component that may be run on one of servers 302 and operating system instances 304. Storage providers 324, 326, and 328 allow system manager 330 to manage storage subsystems 306, 308, and 310 using a standard interface. For example, storage providers 324, 326, and 328 may be storage providers as defined under the Storage Management Initiative—Specification. In this case, the standard interface may be based on the Common Information Model protocol.

System manager 330 includes software for managing various components of data processing environment 300. For example, system manager 330 includes management services 332 for managing various components of data processing environment 330. Management services 332 includes storage system manager 334. Storage system manager 334 is configured for managing storage subsystems 306, 308, and 310 via storage providers 324, 326, and 328. System manager 330 may be implemented on the same one of servers 302 as one or more of storage providers 324, 326, and 328. For example, system manager 330 and storage providers 324, 326, and 328 may be implemented together on a dedicated management server. Alternatively, one or more of storage providers 324, 326, and 328 may be implemented on one or more servers 302 remote from system manager 330. An example of system manager 330 is the IBM Systems Director by International Business Machines Corporation. An example of storage system manager 334 is the IBM Director Storage Manager by International Business Machines Corporation.

System manager 330 preferably includes operating system monitors 336. Operating system monitors 336 monitor the performance of servers 302 and operating system instances 304 running in data processing environment 300. Operating system monitors 336 generate system performance metrics 338. System performance metrics 338 provide an indication of performance of servers 302 and operating system instances 304. For example, system performance metrics 338 may include measures of one or more of processor utilization 340, memory utilization 342, and available file system space 344 by or for servers 302 and operating system instances 304. System performance metrics 338 may include any other measurement that provides an indication of the performance or loading of servers 302 and operating system instances 304. System performance metrics 338 may be stored in system manager database 346.

Storage configuration manager 348 is used by system manager 330 to configure the storage used by data processing environment 300. Storage configuration manager 348 may be provided as plug-in 350 to system manager 330. In accordance with an illustrative embodiment, storage configuration manager 348 includes storage scalability manager 352, storage performance manager 354, storage install manager 356, storage scalability configuration manager 358, and meta-storage provider 360.

Storage performance manager 354 monitors the performance of storage providers 324, 326, and 328. For example, storage performance manager 354 may instrument storage provider software to track the performance of storage providers 324, 326, and 328 with respect to a number of metrics 362. This instrumentation may be provided by a standards based instrumentation mechanism. This service may be implemented on servers 302 and operating system instances 304 where storage providers 324, 326, and 328 are running.

Metrics 362 provide an indication of performance of each of storage providers 324, 326, and 328. For example, metrics 362 may include one or more of the number or quantity of storage controllers assigned to the storage provider 364, processor utilization by the storage provider 366, memory consumption by the storage provider 368, file system usage by the storage provider 370, and query performance of the storage provider 372. Metrics 362 may include any other measurement that provides an indication of the performance of storage providers 324, 326, and 328.

Storage install manager 356 is used to install and configure storage providers on remote servers 302 and operating system instances 304. For example, storage install manager 356 may install a storage provider on a given remote system by using a remote command invocation facility, such as secure shell, SSH, and a secure file transfer service, such as secure file transfer protocol, SFTP.

Storage scalability configuration manager 358 manages configuration of storage devices 312, 314, and 316, storage controllers 318, 320, and 322, and storage providers 324, 326, and 328. Storage scalability configuration manager 358 may operate along with storage system manager 334 in system manager 330.

Storage scalability configuration manager 358 may provide storage controller add/remove wizard 374. Storage controller add/remove wizard 374 may be provided as a graphical user interface. For example, storage controller add/remove wizard 374 may be provided as part of user interface 376 to system manager 330. User interface 376 allows user 378 to interact with system manager 330. For example, user 376 may be a human operator, such as a system administrator. Alternatively, user 378 may be a machine or a machine in combination with a human operator. User interface 376 may be implemented in any manner using appropriate user interface devices. For example, user interface 376 may be implemented using an input/output unit including devices such as a display, keyboard, mouse, touch screen, or other input and output devices.

Storage controller add/remove wizard 374 provides a uniform interface for adding and removing storage controllers to data processing environment 300 via storage system manager 334. For example, storage controller add/remove wizard 374 may allow user 378 to input addresses, such as IP addresses, of storage controllers 318, 320, or 322 to be added or removed. In accordance with an illustrative embodiment, storage controller add/remove wizard 374 interacts with various other components described herein to provide effective management of storage scalability.

In accordance with an illustrative embodiment, storage scalability configuration manager 358 implements configure storage controller function 380. Configure storage controller function 380 provides the ability to configure particular storage controllers 318, 320, and 322 on particular storage providers 324, 326, and 328. Thus, configure storage controller function 380 operates to add storage subsystems 306, 308, and 310 to particular storage providers 324, 326, and 328. If a storage provider 324, 326, or 328 is installed on one of servers 302 remote from system manager 330, configure storage controller function 380 may use secure shell and invoke a remote command to add the addresses of one or more storage controllers 318, 320, or 322 to storage providers 324, 326, and 328. Configure storage controller function 380 also may start a particular storage provider 324, 326, or 328 on a remote one of servers 302, if it is not already started.

Meta-storage provider 360 is a pseudo-storage provider. During operation of system manager 330, meta-storage provider 360 gets discovered and added to system manager 330. Meta-storage provider 360 may be enabled 382 and used in cases where enhanced scalability is required. Alternatively, meta-storage provider 360 may be disabled 384 in other cases or in any case where use of meta-storage provider 360 is not desired. In accordance with an illustrative embodiment, meta-storage provider 360 may be implemented as a light-weight component. Therefore, the resource requirements for meta-storage provider 360 may be very small. Meta-storage provider 360 may run on the same one of servers 302 as system manager 330.

Meta-storage provider 360 provides mapping between storage controllers and storage providers 386. This mapping may be maintained in a simple table. Table 2 is an example of mapping between storage controllers and storage providers 386 that may be maintained by meta-storage provider 360.

TABLE 2

| Storage Controller Address {[CTRLA-PORT1, CTRLA-PORT2], [CTRLB-PORT1-CTRLB-PORT2]} | Provider IP Address (IP Address of the server where storage provider installed) |
|---|---|
| {[10.1.2.60, 10.1.2.61], [10.1.2.62, 10.1.2.63]} | 10.1.2.100 |
| {[10.1.2.50, 10.1.2.51], [10.1.2.52, 10.1.2.53]} | 10.1.2.101 |

Meta-storage provider 360 also implements command and output forwarding function 388. Command and output forwarding function 388 forwards commands to storage providers 324, 326, and 328 and sends back the output to the originator.

Storage scalability manager 352 is the overall coordinating manager of storage performance manager 354, storage install manager 356, storage scalability configuration manager 358, and meta-storage provider 360. Storage scalability configuration manager includes rules 390 for managing the other components to achieve improved storage scalability management. In accordance with an illustrative embodiment, rules 390 may be configurable. For example, a user interface, such as a graphical user interface, may be provided on user interface 376 to allow user 378 to change or modify rules 390.

Rules 390 include threshold values 392. Threshold values 392 may be selected to define that level of performance of a storage provider at which a new storage subsystem may be added to the storage provider without unacceptably reducing performance of the storage provider. Threshold values 392 define the behavior of storage scalability manager 352 to provide improved storage scalability in accordance with an illustrative embodiment, as described in more detail below.

Storage scalability manager 352 may be enabled 394 or disabled 396. The ability to enable or disable storage scalability manager 352 provides uniform experience for existing users of system manager 330. When storage scalability manager 352 is enabled 394, storage scalability manager 352 preferably provides storage scalability services in a seamless way.

Storage scalability manager 352 implements an algorithm to provide improved storage scalability management in accordance with an illustrative embodiment. For example, when storage scalability manager 352 is enabled 394, it may automatically start storage performance manager 354 and also enable storage scalability configuration manager 358. Meta-storage provider 360 now may be visible as one of the storage providers on a list of storage providers available to system manager 330.

Using storage controller add/remove wizard 374, user 378 may identify a storage controller to be added for use in data processing environment 330. In response to identifying a storage controller to be added, storage scalability manager 352 may invoke storage performance manager 354. Storage performance manager 354 queries for metrics 362 for each of storage providers 324, 326, and 328. As discussed above, metrics 362 provide an indication of performance of storage providers 324, 326, and 328. For example, metrics 362 may include one or more of the number of storage controllers assigned to a storage provider 364, processor utilization by the storage provider 366, memory consumption by the storage provider 368, file system usage by the storage provider 370, average query performance of the storage provider 372, or any other measure of storage provider performance.

Metrics 362 for each of storage providers 324, 326, and 328 are compared against number of threshold values 392. If metrics 362 for at least one of storage providers 324, 326, and 328 are within threshold values 392 this indicates that the performance of at least one of storage providers 324, 326, and 328 is such that an additional storage subsystem can be added to that storage provider. Storage scalability manager 352 then selects one of the storage providers for which metrics 362 are determined to be within threshold values 392 as the selected storage provider to which the new storage subsystem is to be added. Storage scalability manager 352 thus will invoke storage scalability configuration manager 358 to add the identified storage controller to the selected storage provider. Storage scalability manager 352 then may update the mapping data in meta-storage provider 360 accordingly.

If metrics 362 for none of storage providers 324, 326, and 328 are within threshold values 392 this indicates that a new storage subsystem should not be added to any of the currently available storage providers 324, 326, and 328. For example, this condition may indicate that all of the currently available storage providers 324, 326, and 328 are busy or at or near capacity such that adding a new storage subsystem to any of storage providers 324, 326, and 328 would overload the storage provider, potentially resulting in a significant reduction in performance. As mentioned above, threshold values 392 may be selected to define that level of performance of a storage provider at which a new storage subsystem may be added to the storage provider without unacceptably reducing performance of the storage provider. If metrics 326 for a storage provider are not within such threshold values 392, then a new storage subsystem should not be added to that storage provider.

In accordance with an illustrative embodiment, if metrics 362 for none of storage providers 324, 326, and 328 are within threshold values 392 a new storage provider is added to data processing environment 300. The new identified storage controller then is added to the new storage provider. As part of this process, the most appropriate one of servers 302 and operating system instances 304 to which the new storage provider is to be added is selected.

To determine the most appropriate one of servers 302 and operating system instances 304, storage scalability manager 352 may query system manager database 346 to obtain a list of servers 302 and operating system instances 304 that are managed by system manager 330 for a particular solution. Storage scalability manager 352 will then query system manager database 346 to obtain system performance metrics 338 for each of the identified operating system instances 304. For example, such system performance metrics 338 may include processor utilization by the operating system instance 340, memory utilization by the operating system instance 342, available file system space of the operating system instance 344, or any other measure of operating system instance performance.

Storage scalability manager 352 compares the retrieved system performance metrics 338 to identify the most appropriate one of servers 302 and operating system instances 304 to which the storage provider may be added. For example, storage scalability manager 352 may compare system performance metrics 338 to identify a selected one of servers 302 and operating system instances 304 for which system performance metrics 338 indicate the most excess performance capacity.

After identifying a selected one of servers 302 and operating system instances 304, storage scalability manager 352 may invoke storage install manager 356 to install and configure a new storage provider on the selected one of servers 302 and operating system instances 304. If the selected one of servers 302 is a remote node, storage install manager 356 may use secure shell and secure file transfer protocol to install and configure the new storage provider.

Storage scalability manager 352 then may invoke storage scalability configuration manager to add the indentified storage controller to the newly added storage provider on the selected one of servers 302 and operating system instances 304. Storage scalability manager 352 also may invoke meta-storage provider 360 to update the mapping data therein accordingly.

System manager 330 now can manage the newly added storage subsystem, execute queries using the new storage subsystem, and perform other control operations as desired.

The illustration of FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in comparing metrics 362 against threshold values 392 storage scalability manager 352 may determine that metrics 362 for more than one storage provider 324, 326, and 328 are within threshold values 392. In this case, storage scalability manager 352 may compare metrics 362 for such storage providers 324, 326, and 328 against each other to select the best one of storage providers 324, 326, or 328 to which the new storage subsystem is to be added. For example, storage scalability manager 352 may select the storage provider 324, 326, or 328 having metrics 362 that are both within threshold values 392 and which indicated the most excess performance capacity as the selected storage provider to which a new storage subsystem is to be added.

Figure 4:
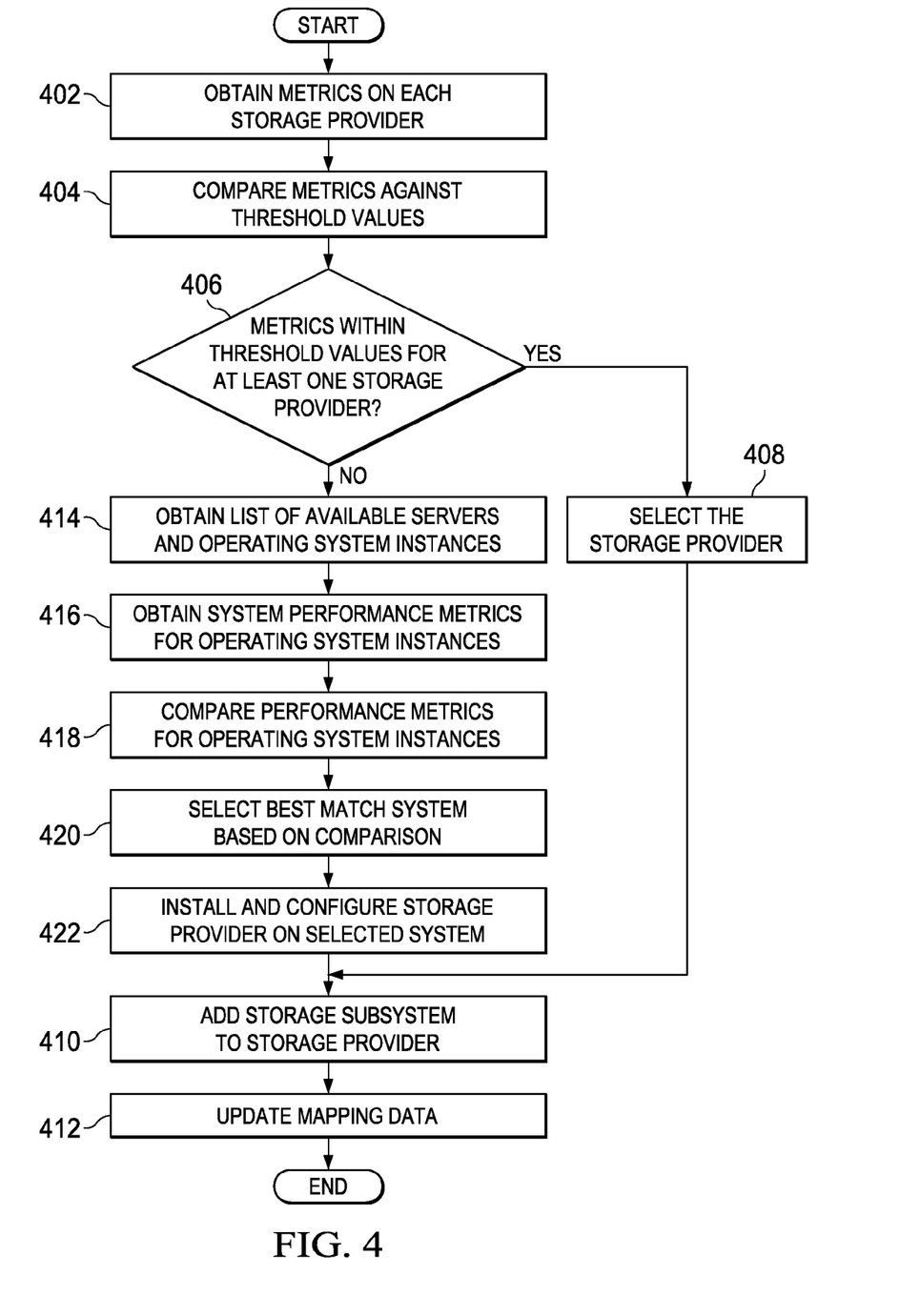
FIG. 4 is a flowchart of a method of adding storage in a data processing environment in accordance with an illustrative embodiment.

A flowchart of a method of adding storage in a data processing environment in accordance with an illustrative embodiment is presented in FIG. 4. The method illustrated in FIG. 4 may be implemented, for example, in data processing environment 300 of FIG. 3. Operation of the method illustrated in FIG. 4 may be initiated, for example, by a user identifying a storage controller to be added to a data processing environment.

A number of metrics for each of a number of storage providers are obtained (step 400). The number of storage providers provide access to a number of storage subsystems by the data processing environment. The number of metrics provide an indication of performance of each of the number of storage providers. For example, step 400 may include obtaining the metrics using a storage performance manager.

The metrics for each of the number of storage providers are compared against a number of threshold values (step 404). It is determined whether the number of metrics are within the number of threshold values for at least one of the number of storage providers (step 406). A positive result to step 406 indicates that the performance of at least one of the number of storage providers is such that an additional storage subsystem can be added to that storage provider. In this case, a storage provider for which the number metrics are within the number of threshold values is selected (step 408). A new storage subsystem then is added to the selected storage provider (step 410). Step 410 may include adding a new storage controller to the selected storage provider. Step 410 may include invoking a storage scalability configuration manager to add the storage controller to the selected storage provider. Mapping data in a meta-storage provider then may be updated accordingly to reflect the new storage subsystem (step 412).

It may be determined at step 406 that the number of metrics for none of the number of storage providers are within the number of threshold values. This determination indicates that a new storage subsystem should not be added to any of the currently available storage providers. In this case, a list of available servers and operating system instances is obtained (step 414). For example, step 414 may include obtaining a list of available servers and operating system instances from a system manager. System performance metrics for each of the identified operating system instances then are obtained (step 416). The system performance metrics provide an indication of performance of the operating system instances. For example, step 416 may include obtaining the system performance metrics from a system manager database.

The system performance metrics for the operating system instances are compared (step 418). Based on the comparison of step 418, the best server and operating system to which a new storage provider may be added is selected (step 420). For example, step 420 may include selecting the server and operating system with the most excess performance capacity based on the comparison of step 418. A new storage provider then is installed and configured on the selected server and operating system instance (step 422). For example, step 422 may include invoking a storage install manager to add the new storage provider on the selected server and operating system instance. A new storage subsystem then is added to the new storage provider (step 410). Mapping data in a meta-storage provider then may be updated accordingly to reflect the new storage subsystem (step 412).

One or more of the illustrative embodiments provides the capability to add storage in a data processing environment in an automated and effective manner. In accordance with an illustrative embodiment, a new storage subsystem is added to an available storage provider only if doing so will not reduce the performance of the storage provider to an unacceptable level. If no such storage provider is available, a new storage provider is added automatically. The new storage provider is added automatically to the server and operating system that is best able to handle the additional work. Thus, in accordance with an illustrative embodiment, a new storage subsystem is added automatically in a data processing environment in a manner that provides for system scalability while minimizing adverse impact on system performance.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes merely a propagating signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "A number", as used herein with reference to items, means one or more items. For example, "a number" of integrated circuits means one or more integrated circuits.

The corresponding structures, materials, acts, and equivalents of all means or step plus function elements in the claims below are intended to include any structure, material, or act for performing the function in combination with other claimed elements as specifically claimed.

The description of the illustrative embodiments provided herein has been presented for purposes of illustration and explanation, but is not intended to be exhaustive or to limit the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. A method of adding storage in a data processing environment, comprising:
    obtaining, by a processor unit, a number of metrics for each of a number of storage providers, wherein the number of storage providers provide access to a number of storage subsystems by the data processing environment and wherein the number of metrics provide an indication of performance of each of the number of storage providers;
    determining, by the processor unit, whether the number of metrics for a selected one of the number of storage providers are within a number of threshold values;
    responsive to a determination that the metrics for the selected one of the number of storage providers are within the number of threshold values, adding a storage subsystem to the selected one of the number of storage providers;
    determining, by the processor unit, whether the number of metrics for none of the number of storage providers are within the number of threshold values; and
    responsive to a determination that the number of metrics for none of the number of storage providers are within the number of threshold values, adding a new storage provider to the data processing environment and adding the storage subsystem to the new storage provider.

2. The method of claim 1, wherein the storage subsystem comprises a storage controller and a storage device.

3. The method of claim 1, wherein adding a new storage provider to the data processing system comprises:
    obtaining, by the processor unit, a list of servers and operating system instances for the data processing environment;

obtaining, by the processor unit, a number of system performance metrics for the servers and operating system instances, wherein the system performance metrics provide an indication of performance of the servers and operating system instances;

comparing, by the processor unit, the system performance metrics for the servers and operating system instances;

selecting, by the processor unit, a selected one of the servers and operating system instances responsive to the comparing of the system performance metrics; and adding the new storage provider to the selected one of the servers and operating system instances.

4. The method of claim 3, wherein the number of system performance metrics are selected from the group of metrics providing an indication of performance of the servers and operating system instances consisting of: processor utilization, memory utilization, and available file system space.

5. The method of claim 1, wherein the number of metrics are selected from the group of metrics providing an indication of performance of a storage provider consisting of: a quantity of storage controllers assigned to the storage provider, processor utilization by the storage provider, memory consumption by the storage provider, file system usage by the storage provider, and query performance of the storage provider.

6. An apparatus, comprising:
a processor unit;
a storage performance manager configured to provide, by the processor unit, a number of metrics for each of a number of storage providers in a data processing environment, wherein the number of storage providers provide access to a number of storage subsystems by the data processing environment and
wherein the number of metrics provide an indication of performance of each of the number of storage providers;
a storage scalability configuration manager configured to add, by the processor unit, a storage subsystem to a storage provider;
a storage install manager configured to install and configure, by the processor unit, a new storage provider in the data processing environment; and a storage scalability manager configured to determine, by the processor unit, whether the number of metrics for a selected one of the number of storage providers are within a number of threshold values, responsive to a determination that the metrics for the selected one of the number of storage providers are within the number of threshold values, invoke the storage scalability configuration manager to add a storage subsystem to the selected one of the number of storage providers, determine whether the number of metrics for none of the number of storage providers are within the number of threshold values, and responsive to a determination that the number of metrics for none of the number of storage providers are within the number of threshold values, invoke the storage install manager to add a new storage provider to the data processing environment and invoke the storage scalability configuration manager to add the storage subsystem to the new storage provider.

7. The apparatus of claim 6, wherein the storage subsystem comprises a storage controller and a storage device.

8. The apparatus of claim 6, further comprising:
a system manager database, wherein the system manager database includes a list of servers and operating system instances for the data processing environment and a number of system performance metrics for the servers and operating system instances, wherein the system performance metrics provide an indication of performance of the servers and operating system instances; and
wherein the storage scalability manager is further configured to
obtain the list of servers and operating system instances from the system manager database,
obtain the number of system performance metrics from the system manager database,
compare the system performance metrics for the servers and operating system instances,
select a selected one of the servers and operating system instances responsive to the comparing of the system performance metrics, and
invoke the storage install manager to configure and install the new storage provider on the selected one of the servers and operating system instances.

9. The apparatus of claim 8, wherein the number of system performance metrics are selected from the group of metrics providing an indication of performance of the servers and operating system instances consisting of: processor utilization, memory utilization, and available file system space.

10. The apparatus of claim 6, wherein the number of metrics are selected from the group of metrics providing an indication of performance of a storage provider consisting of: a quantity of storage controllers assigned to the storage provider, processor utilization by the storage provider, memory consumption by the storage provider, file system usage by the storage provider, and query performance of the storage provider.

11. A non-transitory computer program product for adding storage in a data processing environment, said computer program product comprising:
a computer readable storage medium;
first program instructions stored in the computer readable storage medium to obtain a number of metrics for each of a number of storage providers, wherein the number of storage providers provide access to a number of storage subsystems by a data processing environment and wherein the number of metrics provide an indication of performance of each of the number of storage providers;
second program instructions stored in the computer readable storage medium to determine whether the number of metrics for a selected one of the number of storage providers are within a number of threshold values;
third program instructions stored in the computer readable storage medium to add a storage subsystem to the selected one of the number of storage providers responsive to a determination that the metrics for the selected one of the number of storage providers are within the number of threshold values;
fourth program instructions stored in the computer readable storage medium to determine whether the number of metrics for none of the number of storage providers are within the number of threshold values;
fifth program instructions stored in the computer readable storage medium to add a new storage provider to the data processing environment and to add the storage subsystem to the new storage provider responsive to a determination that the number of metrics for none of the number of storage providers are within the number of threshold values; and
wherein said first, second, third, fourth, and fifth program instructions are stored on said computer readable storage medium.

12. The non-transitory computer program product of claim 11, wherein the storage subsystem comprises a storage controller and a storage device.

13. The non-transitory computer program product of claim 11, further comprising:
- sixth program instructions stored in the computer readable storage medium to obtain a list of servers and operating system instances for the data processing environment;
- seventh program instructions stored in the computer readable storage medium to obtain a number of system performance metrics for the servers and operating system instances, wherein the system performance metrics provide an indication of performance of the servers and operating system instances;
- eighth program instructions stored in the computer readable storage medium to compare the system performance metrics for the servers and operating system instances;
- ninth program instructions stored in the computer readable storage medium to select a selected one of the servers and operating system instances responsive to the comparing of the system performance metrics;
- tenth program instructions stored in the computer readable storage medium to add the new storage provider to the selected one of the servers and operating system instances; and wherein said sixth, seventh, eighth, ninth, and tenth program instructions are stored on said computer readable storage medium.

14. The non-transitory computer program product of claim 13, wherein the number of system performance metrics are selected from the group of metrics providing an indication of performance of the servers and operating system instances consisting of: processor utilization, memory utilization, and available file system space.

15. The non-transitory computer program product of claim 11, wherein the number of metrics are selected from the group of metrics providing an indication of performance of a storage provider consisting of: a quantity of storage controllers assigned to the storage provider, processor utilization by the storage provider, memory consumption by the storage provider, file system usage by the storage provider, and query performance of the storage provider.

* * * * *